United States Patent
Van de Steeg et al.

(10) Patent No.: US 8,634,325 B2
(45) Date of Patent: Jan. 21, 2014

(54) TUNING OF INDUSTRIAL AUTOMATION SYSTEM PERFORMANCE BASED ON DEVICE OPERATING CHARACTERISTICS

(75) Inventors: Kerry Van de Steeg, Windham, NH (US); Richard A. Blair, Plaistow, NH (US); Kenneth S. Lee, Cambridge, MA (US)

(73) Assignee: Schneide Electric USA, Inc., Palatine, IL (US)

( * ) Notice: Subject to any disclaimer, the term of this patent is extended or adjusted under 35 U.S.C. 154(b) by 13 days.

(21) Appl. No.: 11/967,848

(22) Filed: Dec. 31, 2007

(65) Prior Publication Data
US 2009/0168806 A1 Jul. 2, 2009

(51) Int. Cl.
G05B 13/00 (2006.01)
G06F 19/00 (2011.01)
G06F 3/00 (2006.01)

(52) U.S. Cl.
USPC ............ 370/254; 710/104; 700/14; 700/19; 709/220

(58) Field of Classification Search
USPC ......... 700/1, 2, 5, 11–12, 14, 17, 19, 95, 108, 700/112; 370/254, 255, 419, 498; 709/208, 709/210, 220, 222; 710/104
See application file for complete search history.

(56) References Cited

U.S. PATENT DOCUMENTS

| | | | | |
|---|---|---|---|---|
| 4,747,100 A | * | 5/1988 | Roach et al. | 370/452 |
| 5,887,029 A | * | 3/1999 | Husted et al. | 375/224 |
| 5,924,109 A | * | 7/1999 | Ackerman et al. | 715/234 |
| 6,349,306 B1 | * | 2/2002 | Malik et al. | 707/779 |
| 6,449,715 B1 | * | 9/2002 | Krivoshein | 713/1 |
| 6,687,772 B1 | | 2/2004 | Eidson | |
| 7,082,467 B2 | | 7/2006 | Border et al. | |
| 7,359,870 B1 | * | 4/2008 | Hadfield et al. | 705/26.8 |
| 7,376,472 B2 | * | 5/2008 | Wojsznis et al. | 700/29 |
| 8,055,743 B2 | * | 11/2011 | Frutiger et al. | 709/223 |
| 2003/0061384 A1 | * | 3/2003 | Nakatani | 709/245 |
| 2003/0129755 A1 | * | 7/2003 | Sadler et al. | 436/43 |
| 2003/0163653 A1 | * | 8/2003 | Skendzic et al. | 711/153 |
| 2003/0236937 A1 | * | 12/2003 | Barros De Almeida et al. | 710/305 |
| 2004/0034658 A1 | | 2/2004 | Potter et al. | |
| 2004/0059844 A1 | | 3/2004 | Jones et al. | |
| 2004/0098148 A1 | * | 5/2004 | Retlich et al. | 700/83 |

(Continued)

FOREIGN PATENT DOCUMENTS

WO 2007125462 11/2007

OTHER PUBLICATIONS

Viktor Schiffer, The CIP Family of Fieldbus Protocols and its newest Member—Ethernet/IP, IEEE 2001, pp. 377-384.*
"Next Editions of Devicenet and Ethernet/IP Specifications Published," printed from www.odva.org on Dec. 7, 2006, one page.
Shizhuang, et al., "ZigBee Based Wireless Sensor Networks and Its Applications in Industrial", 2007 IEEE International Conference on, IEEE, Aug. 1, 2007, pp. 1979-1983.
International Search Report, mailed Aug. 5, 2009, for PCT/US2008/088113 (16 pages).
Communication Relating to the Results of the Partial International Search, mailed Jun. 17, 2009, for PCT/US2008/088113 (6 pages).

*Primary Examiner* — Ahmed Elallam
(74) *Attorney, Agent, or Firm* — Banner & Witcoff, Ltd.

(57) ABSTRACT

Each device in an industrial automation system network or other network may have its own associated one or more performance characteristics, such as response time and/or reset time of the network device. Data may be stored representing a plurality of performance characteristics each associated with a different one of a plurality of devices in the network including a first device and a second device. The stored data may be retrieved, representing the performance characteristic of the second device. The first device may communicate over the network with the second device in accordance with the performance characteristic of the second device.

17 Claims, 3 Drawing Sheets

(56) References Cited

U.S. PATENT DOCUMENTS

| | | |
|---|---|---|
| 2005/0108453 A1* | 5/2005 | Maturana et al. ............ 710/100 |
| 2005/0256939 A1 | 11/2005 | Naismith et al. |
| 2006/0234644 A1 | 10/2006 | Ludwig et al. |
| 2007/0078956 A1* | 4/2007 | VanGompel ................ 709/220 |
| 2008/0077268 A1* | 3/2008 | Retlich et al. ................ 700/117 |
| 2008/0235420 A1* | 9/2008 | Wei .............................. 710/110 |
| 2009/0157839 A1* | 6/2009 | Diederichs et al. .......... 709/208 |
| 2009/0172223 A1* | 7/2009 | Lee et al. ..................... 710/104 |

* cited by examiner

US 8,634,325 B2

TUNING OF INDUSTRIAL AUTOMATION SYSTEM PERFORMANCE BASED ON DEVICE OPERATING CHARACTERISTICS

BACKGROUND

Industrial automation systems typically include networks that allow multiple distributed automation devices to communicate with each other. These network devices typically communicate with each other by sending and receiving messages via the network. The network devices nearly always follow an agreed communication protocol defining certain data format, timing, and collision rules, as well as physical requirements such as signal voltages and currents as well as device impedances. For example, some networks follow a universal serial bus (USB) communication protocol, others may follow an Ethernet communication protocol, and still other networks may follow a CANopen communication protocol based on the controller area network (CAN) standard.

Under some communication protocols, message receipt is presumed. In other communication protocols a response to the message from the recipient network device is expected. The response may be a simple acknowledgement of message receipt and/or may include other information. In either case, there is often a known time to wait between sending each of multiple messages to a recipient device and/or between sending a message and expecting to receive a response thereto. Typically, this wait time is recipient independent. That is, for a given message, the wait time is the same for all recipient network devices. In such networks, the wait time is normally determined to be the worst-case (i.e., maximum) expected wait time that would occur in the network during normal operation.

This one-size-fits-all wait time may work in some networks, but quickly becomes cumbersome in other networks, especially in large industrial automation networks. For instance, the larger the network, the more the aggregate wait time may be expected to increase, since a proportionally larger amount of time may be spent waiting for an offline or faulty device to respond. In addition, startup times may be adversely affected in larger networks. Network devices in a smaller network may be able to be exposed to a higher throughput than if those same network devices were in a larger network with a larger wait time. For instance, the USB communication protocol defines a wait time of ten milliseconds for each device. However, this inflexible approach typically limits the practical size of such a network. Moreover, as electronics and computer technology improves, network devices continue to quicken their processing and response times. To account for this network device improvement, many communication protocols have been revised to reduce wait times. For instance, the USB 1.0 communication protocol eventually developed into the higher speed USB 2.0 communication protocol, which has a reduced fixed wait time.

Nonetheless, in all of the above discussed network approaches, imposed uniform communication specifications have held back industrial automation network performance. This is especially true with larger networks and/or networks that have varied network devices with disparate response times and/or other characteristics.

SUMMARY

Accordingly, it is desirable to provide a way to potentially improve the performance of networks, especially those used in industrial automation systems that interconnect a large number of distributed automation devices. One way to accomplish this is to reduce the average turnaround time of messages sent within the network.

A network may be provided having a number of diverse network devices coupled together. Each network device may store and/or otherwise be associated with salient communication parameters that may be used by the system to tune itself. For instance, each network device may have its own associated one or more operating characteristics, such as response time and/or reset time of the network device. In practice, operating characteristics for different network devices may vary greatly. If these different operating characteristics are known to the network, communication may be handled differently depending upon which of the network devices are communicating with each other.

Thus, a one-size-fits-all wait time is no longer necessary. In fact, other communication aspects may additionally or alternatively be adjusted depending upon the particular network devices that are communicating, such as message length, message format, etc. When a network device is added to a network, the operating characteristics associated with that network device may be added to the existing knowledge base of operating characteristics.

Allowing a network to self-tune in this way may be particularly useful where a high level of determinism is desired. That is, self-tuning may be particularly useful where the application in which the network is being used requires predictability as to the timing of certain messages and actions by the network. An example of such an application is industrial automation, where many different robots (for instance) may need to operate in a highly coordinated way, especially in a pipeline manufacturing scenario. In addition, self-tuning may result in a faster overall network (for instance, by reducing the average message wait time), thereby potentially allowing more products to be produced on an automated assembly line where the network might otherwise be the speed-limiting factor. Faster production by a given production facility may mean that fewer parallel production facilities are needed, as well as lower production costs and/or higher production rates.

Operation of such a network may involve, for instance, the following: storing data representing a plurality of operating characteristics each associated with a different one of a plurality of devices in the network including a first device and a second device; retrieving the stored data representing the operating characteristic of the second device; and the first device communicating over the network with the second device in accordance with the operating characteristic of the second device.

In addition, the self-tuning network may be coupled to one or more other networks that may also (or may not be) self-tuning. The coupling may be via, for instance, a network interface module (NIM). From one network's point of view, the other coupled network may appear as a single network device, accessed through the NIM device, with a single set of associated operating characteristics. Thus, tuning among multiple networks may also be achieved.

Further aspects are directed to a software tool that generates a file associated with a device, such as an EDS file, that contains one or more of the operating characteristics of the device. Likewise, a software tool may be provided that extract the operating characteristics from the file.

These and other aspects of the disclosure will be apparent upon consideration of the following detailed description of illustrative aspects.

BRIEF DESCRIPTION OF THE DRAWINGS

A more complete understanding of the present disclosure may be acquired by referring to the following description in consideration of the accompanying drawings, in which like reference numbers indicate like features, and wherein.

DETAILED DESCRIPTION

The various aspects summarized previously may be embodied in various forms. The following description shows by way of illustration various examples in which the aspects may be practiced. It is understood that other examples may be utilized, and that structural and functional modifications may be made, without departing from the scope of the present disclosure.

Except where explicitly stated otherwise, all references herein to two or more elements being "coupled" to each other are intended to broadly include both (a) the elements being directly connected to each other, or otherwise in direct communication with each other, without any intervening elements, as well as (b) the elements being indirectly connected to each other, or otherwise in indirect communication with each other, with one or more intervening elements. Also, all communications between elements may be bidirectional or unidirectional as desired unless explicitly stated otherwise.

Figure 1:
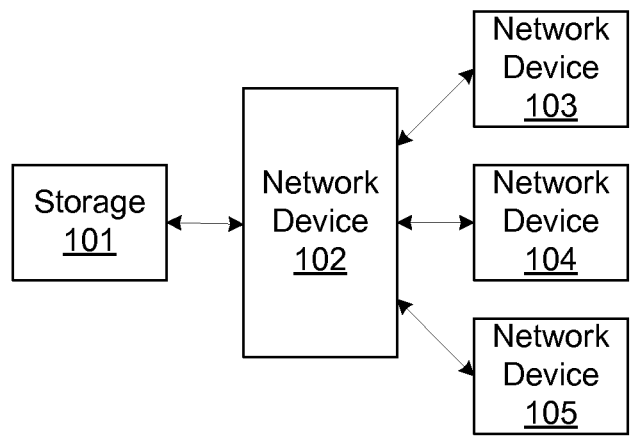
FIG. 1 is a functional block diagram of an illustrative network.

Referring to FIG. 1, an illustrative network is shown, in which network devices 102, 103, 104, and 105 are coupled together. In this example of a network, network device 102 may be considered a master or client device, and network devices 103-105 may be considered slave or server devices. This is because all communications between network devices 103-105 are made through network device 102. This network topology is sometimes referred to as a hub-and-spoke topology, where the hub is the primary device and the spokes extend to the secondary devices. Network devices 102-105 may be any types of devices capable of communicating with another one of the network devices via the network. For example, network devices 102-105 may be or otherwise include computers, sensors, robotic devices, network interface modules (NIMs), and/or user interfaces.

The network of FIG. 1 as shown also includes at least one storage unit 101. Storage unit 101 in this example is coupled to at least one network device 102. Storage unit 101 may store data representing one or more operating characteristics of each network device 102, 103, 104, and/or 105. The data may be stored or otherwise represented in storage unit 101 so as to associate operating characteristics with their respective network devices, such as in a query-able database format. Storage unit 101 may include one or more computer-readable storage media for storing the above-mentioned data, such as one or more magnetic discs, optical discs, and/or magnetic tapes, as well as hardware and/or software (computer-readable instructions) for writing to and reading from the computer-readable storage media. The hardware and/or software may further provide database functionality (e.g., responding to queries, associating stored data, etc.).

Figure 2:
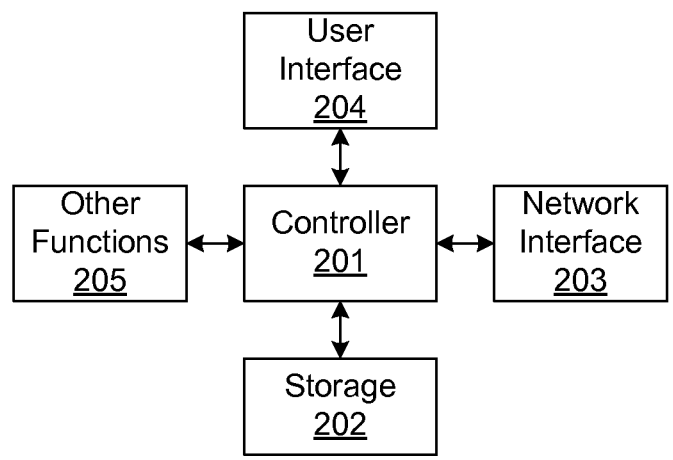
FIG. 2 is a functional block diagram of a network device that may be used in a network.

Network devices 102-105 may include data processing and network communication capabilities. FIG. 2 is an illustrative functional block diagram of a network device such as network devices 102-105. As shown, a network device may include a controller 201, storage unit 202, a network interface 203, a user interface 204, and/or units 205 for performing other functions. Controller 201 may be any type of controller that deals with data, such as a processor, a computer, and the like, all coupled together as shown. Storage unit 202 may include any one or more computer-readable media such as previously described, as well as any hardware and/or software that may be desired for writing to and/or reading from the computer-readable media. Network interface 203 may include any transmission and/or reception circuitry for communicating through the network (e.g., sending messages and/or receiving responses thereto and/or other messages). User interface 204 may allow a human user to provide input to and/or receive input from the network device. For example, user interface 204 may include a keyboard for inputting data and/or a display for visually presenting data. Other functions 205 may include any other functions that are desired to be performed by the network device that are not handled by elements 201-204. For example, where the network device is or otherwise includes a printer, other functions 205 may include printing to paper.

In operation, storage unit 202 of the network device may store data and/or computer-executable instructions used for the particular operations performed by the network device. Storage unit 202 may further store operating characteristics of that network device and/or of any other network devices in the network. Thus, the operating characteristics of the various network devices may be stored individually or collectively in network storage unit 101 and/or in storage unit 202 of one or more of the network devices themselves.

When the network device is ready to send a message to another network device (the recipient network device), controller 201 and/or the sending network device may look up one or more operating characteristics associated with the recipient network device. Controller 201 may generate a message and forward the message to the recipient device via network interface 203 and the network. As will be described in further detail with regard to FIG. 3, controller 201 may send the message, await a response to the message, and/or otherwise communicate with the recipient device in a manner that depends upon the one or more operating characteristics associated with the recipient network device.

An example of the stored one or more operating characteristics is shown below in Table 1. Table 1 indicates maximum expected times for various situations. In this example, the network communications protocol is the CANopen protocol. This well-known protocol uses various types of messages, including a service data object (SDO), a process data object (PDO), and a network management (NMT) message. Although any of the message types may be used for different purposes, a PDO is generally used for periodic and/or frequently sent information, because it has a relatively low overhead. SDO is generally used for any other communication and is a relatively more configurable and flexible type of message. NMT messages are generally used by the device in charge of configuring other devices to start, stop, reset, and otherwise change the operating state of the controlled devices. Because the different message types may be processed differently by a given recipient network device, the turnaround (e.g., acknowledgment) time for these message types may also differ. For instance, the operating characteristics listed for network device A are a maximum expected SDO response time of 2 milliseconds (ms), a maximum expected PDO response time of 1 ms, and a maximum expected device reset time of 300 ms. In some embodiments, there may be no network-level acknowledgments, and thus the PDO response time value may not be used directly. However, even in these embodiments, the PDO response time may be related to how quickly the device can process new data.

TABLE 1

| Network Device ID | SDO Response Time | PDO Response Time | Device Reset Time |
|---|---|---|---|
| A | 2 ms | 1 ms | 300 ms |
| B | 10 ms | 4 ms | 10 ms |
| C | 50 ms | 2 ms | 1000 ms |

Figure 3:
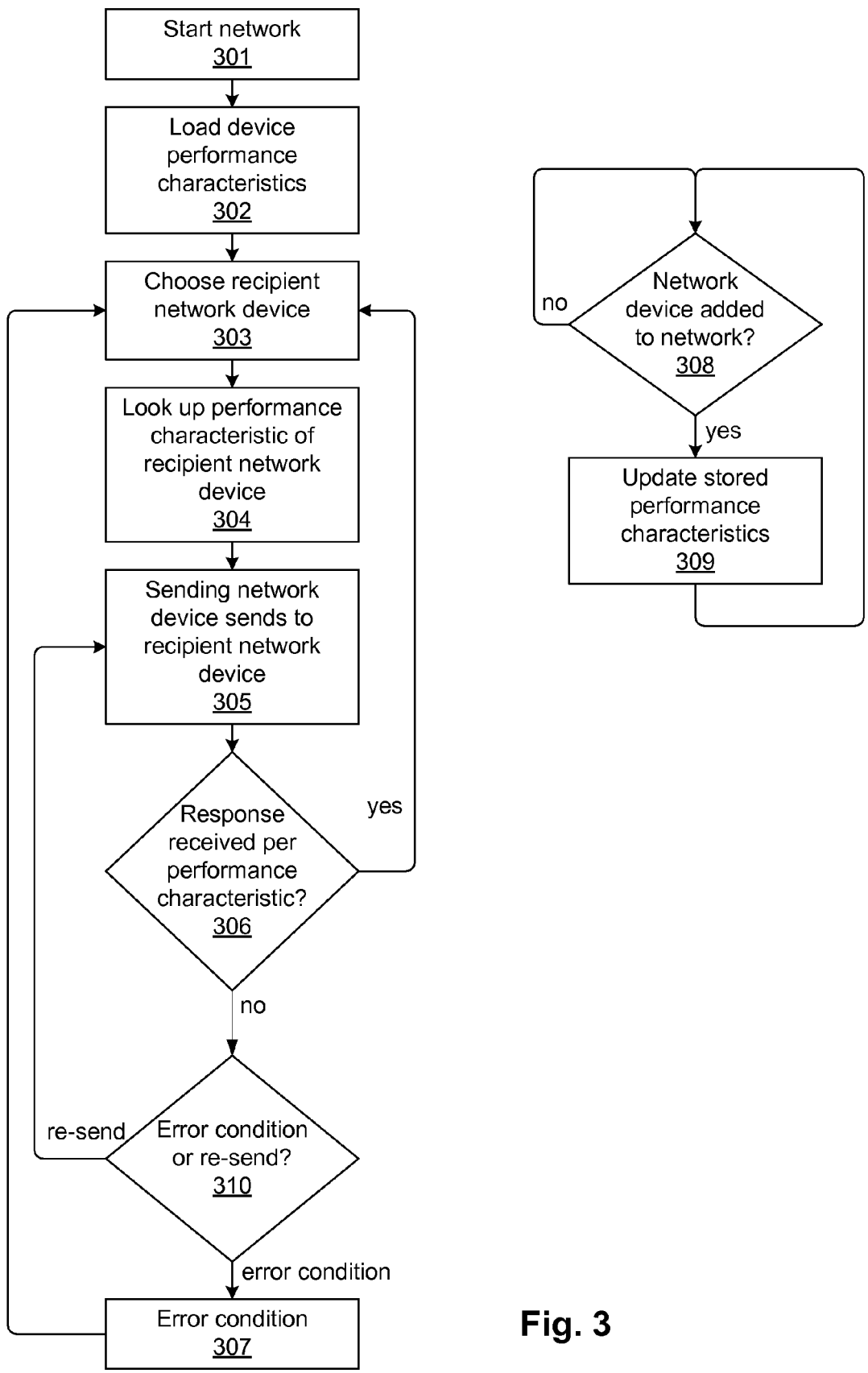
FIG. 3 is a flow chart showing steps in an illustrative process performed by a network and/or by a network device in the network.

FIG. 3 shows an illustrative process that may be performed in which individual network device operating characteristics are taken into account when communicating between network devices. This process may be performed by one or more of the network devices, such as network devices 102, 103, 104, and/or 105, and/or by any other devices such as storage unit 101.

In step 301, the network is started, such as by powering up the network and/or the various network devices in the network. Startup may also include waiting for the various network devices to complete their individual power-up routines. Rather than a cold startup from a power-off state, step 301 may alternatively be a network reset or other similar event.

In step 302, the various operating characteristics of the network devices are loaded. This may be performed by, for instance, receiving and storing the operating characteristics (such as those shown in Table 1) into network storage unit 101 and/or into storage unit 202 of one or more of the network devices. Where the operating characteristics are already stored in network storage unit 101, some or all of the operating characteristics may be transferred from storage unit 101 into storage unit 202 of one or more of the network devices.

The network is now ready for communication between network devices. Thus, in step 303, one of the network devices (referred to herein as the sending network device) chooses another of the network devices (referred to herein as the recipient network device) with which to communicate. To perform such a transaction, in step 304 the sending network device may determine one or more of the operating characteristics of the recipient network device. Such determination may be performed by, for instance, obtaining the one or more operating characteristics from storage unit 101, from storage unit 202 of the sending network device, and/or from storage unit 202 of another network device.

The particular operating characteristic that is determined may depend upon the type of communication desired by the sending network device. For example, referring to Table 1, the recipient network device may be network device B, and the sending network device may intend to send an SDO message to network device B. In that case, the sending network device may determine from the stored data in storage units 101 and/or 202 that the SDO response time of the recipient network device is 10 ms. However, if the sending device desires instead to send a PDO message to network device B, then the sending network device may determine that the PDO response time of the recipient network device is 4 ms.

The illustrative operating characteristics shown in Table 1 are time-related. That is, each of the operating characteristics defines a period of time. Other examples of time-related operating characteristics include bootstrap/reset time, power cycle time, guard message response time, heartbeat response time, and sync reaction time. However, operating characteristics may be other than time-related characteristics. For example, a operating characteristic may define the length and/or format of a type of message recognized by the recipient network devices, the message queue length of a device (e.g., the amount of memory available for handling incoming message, or the number of incoming messages that can be handled at a given time), or whether incoming messages may be taken in parallel or serially. Another example of an operating characteristic is the maximum throughput of a device. In a CANopen network, for example, the maximum throughput may or may not be related to the PDO response time. In general, an operating characteristic of a device is any characteristic that describes how that device operates. The operation of a device in this context is not limited to how the device communicates within the network, but also how the device communicates externally to the network (e.g., directly with a user), and how the device interacts physically with the real world (e.g., where the device is a robot, how the device moves, or the physical position of a robot arm, etc.).

The above examples have been described in relation to a CANopen network protocol. However, the aspects described herein may be utilized in any type of network using any type of protocol and communicating with other types of messages. For example, the network may generally use periodically transmitted messages and/or on-demand messages. Some of these messages may contain a predetermined or fixed amount of data in a predetermined format, and may be transmitted at deterministic times, such as those used for communicating a small amount of data using relatively low overhead. Others of these messages may be of a more flexible format and/or timing, where the amount of data contained by the message, and the timing of when the message is transmitted, is less predictable or unpredictable. The various messages may contain information regarding device or network configuration, status, diagnostic information, and/or other information. And, the various message may additionally or alternatively contain commands for performing an operation, such as a request to change a device state or device mode (e.g., change from torque mode to device mode or position mode), change units (e.g., change from pounds to kilograms or inches to centimeters), a request to reset a device, or a request to change one or more operating characteristics of a device. Messages requesting reset or changing operational characteristics may require special handling for detection of loss of communication, due to the potentially large amount of time that may be required by the receiving network device to implement the reset or operational characteristic change.

In determining the one or more operating characteristics of the recipient network device, the sending device may directly retrieve this information for storage or send an appropriate database query, such as to storage units 101 and/or 202. In response to the query, storage units 101 and/or 202 may return the requested operating characteristic information to the requesting network device.

Next, in step 305, the sending network device sends the desired message via the network to the recipient network device. The length, format, and/or any other aspect of the message may depend upon the one or more operating characteristics of the recipient network device. For instance, where the operating characteristic defines a specific message length or format, the message may be generated so as to be consistent with the specified message length or format.

In addition or alternatively to message length/formatting, the one or more operating characteristics of the recipient network device may be time-related, such as by defining an expected maximum response time. In such a situation, the sending network device in step 306 may listen for a response to the message received via the network from the recipient network device. The sending network device may further start a timer for the maximum expected response time of the recipient network device or otherwise keep track of time passing since the message was sent. The response may be any type of response, such as a simple acknowledgment message, and/or a message containing information requested by the message.

If the response is determined to be received within the expected maximum response time (e.g., by receiving the response prior to expiration of the timer), then the sending network device may consider the transaction successful and record this by setting one or more bits in storage unit 202 to an appropriate value, and the process may move back to step 303 for another communication by that network device to another recipient network device, if desired.

If the response is determined not to have been received within the expected maximum response time (e.g., by the timer expiring prior to receiving a response), then there may be a problem with the transaction, and this may be recorded by setting one or more bits in storage unit 202 to an appropriate value. In this case, a number of actions may be taken. For example, in step 310 the sending network device may attempt to repeat, or re-send, the message to the recipient network device in step 305. Alternatively or additionally, in step 310 the sending network device may determine that an error condition is present (step 307) and terminate communications with that particular recipient network device. In such a case, the process for that sending network device may move back to step 303 for communication with another recipient network device.

Thus, rather than waiting for a uniform amount of time for all communications, the sending device may await a response for a custom-tailored amount of time depending upon one or more operating characteristics of the recipient network device that are known to the sending network device.

Another portion of the process is shown with regard to steps 308 and 309, in which a network device is added to the network. These steps may be performed independently of and/or in parallel with steps 301-307. In step 308, the network and/or one or more of the network device may sense that a new network device has been added to the network. Such a condition may be sensed by, for instance, the new network device sending out a message over the network announcing itself. In response, one or more of the operating characteristics of the new network device are added to the existing stored operating characteristics in step 309.

The operating characteristics of the various network devices may be defined by the manufacturer of each network device and provided to the network (e.g., provided to storage unit 101 and/or storage unit 202) in any of a number of ways. For example, information representing operating characteristics of a newly-added network device may be stored in that network device in storage unit 202. In that case, that information may be disseminated to the network upon connection of the new network device to the network and/or upon request by the network and/or another network device in the network. Another way that the operating characteristic information for the new network device may be provided to the network by manually loading the information, such as by reading the information from a computer-readable medium (e.g., a compact disc) and transferring this read information into storage unit 101 and/or storage unit 202 of one or more of the network devices in the network. An electronic data sheet (EDS) file is sometimes provided with conventional network devices, such as in CANopen and DeviceNet devices. An EDS file is often provided as a text file or other type of file that lists certain information about the network device, such as manufacturer, serial number, version, and objects in the network device. It may be desirable to include the operating information in the EDS file, such as in the comments field of the EDS file.

Figure 5:
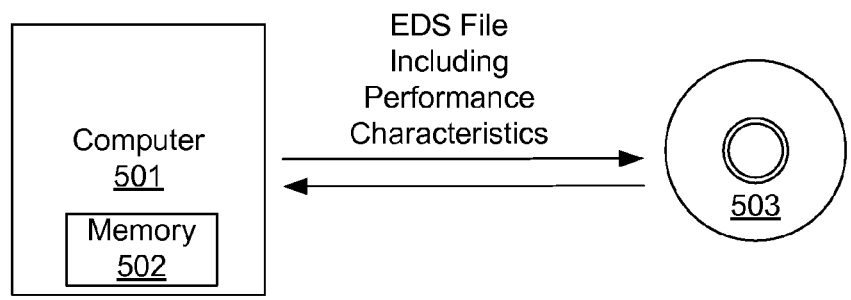
FIG. 5 is a functional block diagram of a computer system for implementing various software tools for reading and writing operating characteristics.

A software tool may be provided in the form of computer-executable instructions for creating or modifying an EDS file (or another file) to include information describing or otherwise identifying the operating characteristics of a device. For instance, referring to FIG. 5, a computer 501 may execute the computer-executable instructions stored on a computer-readable medium (such as a memory 502, a magnetic disc, or an optical disc) for writing such an EDS file to the same or another computer-readable medium (in this example, an optical disc 503). Likewise, another software tool may be provided in the form of computer-executable instructions for extracting the operating characteristics from an EDS file (or another file) so that the operating characteristics may be stored in the appropriate location in the network. The extracted operating characteristics may then be stored separately from the EDS file, such as in storage units 101, 202, 401, or 408. For instance, computer 501 may execute these computer-executable instructions stored in memory 502, to read and extract the operating characteristics from the EDS file stored on disc 503.

Any one or more of steps 302-309 may be performed by any one or more of the network devices, either collectively or individually. In particular, any one or more of the functions of steps 302-309 may be performed by controller 201 of the relevant network device. In addition, steps 304 and 309 may involve retrieving and/or storing information from and/or to storage, such as storage unit 101 and/or storage unit 202. In steps 305, 306 and 308, network interface 203 may be used to send and/or receive relevant data to and/or from the network, such as sending messages, receiving responses, and detecting new network devices added to the network.

It is further noted that the steps of FIG. 3, as well as their ordering, are illustrative only. Some steps may be omitted, and others added. Steps may be performed in a different order. In addition, some steps may be performed simultaneously with other steps. For example, the device operating characteristics are loaded in step 302. However, it may be desirable that the device operating characteristics are already pre-loaded prior to network startup, and so step 302 may be skipped. As another example, steps 304 and 305 may be performed simultaneously, or step 305 may be performed prior to step 304, especially where the relevant operating characteristic is response-time-related.

Figure 4:
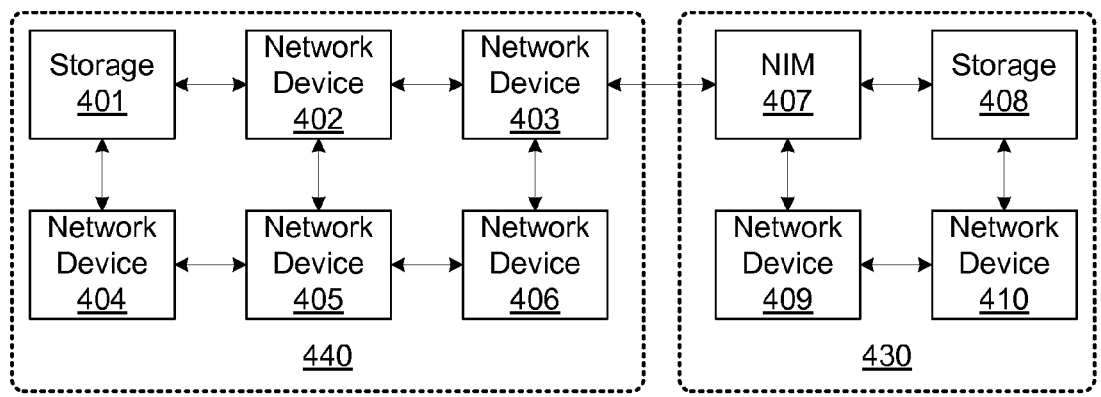
FIG. 4 is a functional block diagram of another illustrative network including an island.

The above-described illustrative process may be applied to a variety of networks. For example, referring to FIG. 1, the sending and recipient network devices may be any of network devices 102-105. Another example of a network that may perform the process of FIG. 3 is shown in FIG. 4. FIG. 4 shows an example of a network made up of a main network 440 and an island network 430. Main network includes network devices 402, 403, 404, 405, and 406, as well as storage unit 401 (which may function in the same way as storage unit 101 for network devices 402-406). Island network 430 includes network devices 409 and 410, storage unit 408, and a network interface module (NIM) 407. NIM device 407 may alternatively or additionally be considered part of main network 440. Storage unit 408 may function in the same way as storage unit 101 for network devices 409 and 410, and may be separate from or a part of NIM device 407. In addition, operating characteristics of NIM device 407 (which may itself be considered a network device) may be stored by storage unit 408.

Main network 440 and island network 430 may be topographically separated by NIM device 407 for any of a number of reasons. For example, main network 440 and island network 430 may operate under different network communication protocols. Or, for security reasons, island network 430 may be a private network that is not intended to be directly accessible by users of devices in main network 440 (or vice versa). In any event, NIM device 407 acts to translate and/or handshake between main network 440 and island network 430. More generally, networks 440 and 430 communicate with each other through NIM device 407.

Communications between network devices within the same network (i.e., communications between network devices 401-406 or communications between network devices 408-410) may be performed just as previously described with regard to FIG. 3. Where communication is performed between a network device in main network 440 and a network device in island network 430, the communication may be intercepted and reformatted if appropriate by NIM device 407. In addition, from the point of view of any network device within main network 440, all network devices on island network 430 may appear as a single network device, accessed through NIM device 407, with a single set of associated operating characteristics for that single apparent device. The operating characteristics for all of the network devices on island network 430 may be controlled by NIM device 407, and from the point of view of main network 440 these operating characteristics may appear to all describe operating characteristics of NIM device 407. Other than that, the transaction may proceed as in FIG. 3. Although storage units 401 and 408 are shown as separate storage units in FIG. 4, they may be combined and located at either main network 440 or island network 430.

The aspects described herein may be applied to any type of network, such as a wired network, a wireless network, a computer network, a telephone network (cellular or land-based), a satellite communication network, a local area network (LAN), a wireless local area network (WLAN), a wide area network (WAN), the Internet, etc. Moreover, the operating characteristics of a particular network device may depend upon the type of network over which it is communicating. For example, a given network device may exhibit a much shorter response time when connected to a high-speed optical fiber network as compared with when it is connected to a satellite communication network.

Thus, ways for allowing a network to dynamically account for the operating characteristics of existing and newly-added network devices have been described. By tailoring each network communication to the operating characteristics of the network devices involved, the performance of a network may be enhanced.

What is claimed is:

1. A method in a network of an industrial automation system having access to stored data representing a plurality of operating characteristics associated with a plurality of devices in the network including a first device and a second device, the method comprising:
  retrieving by the first device, prior to any communication over the network between the first device and the second device, the stored data representing a first operating characteristic of the second device comprising a first length of a first type of message accepted by the second device and a second operating characteristic of the second device comprising a first format of the first type of message; and
  the first device communicating over the network with the second device in accordance with the first length and the first format.

2. The method of claim 1, further comprising determining an identity of the second device, wherein said retrieving comprises retrieving the stored data based on the determined identity of the second device.

3. The method of claim 1, further comprising:
  adding a third device to the network;
  receiving, prior to any communication over the network between the first device and the third device, data representing an operating characteristic of the third device;
  updating the stored data to represent the operating characteristic of the third device;
  retrieving the stored data representing the operating characteristic of the third device; and
  the first device communicating over the network with the third device in accordance with the operating characteristic of the third device.

4. The method of claim 1, wherein the operating characteristics of the second device represented by the retrieved data further comprises a response time of the second device.

5. The method of claim 1, wherein the operating characteristic of the second device represented by the retrieved data further comprises a reset time of the second device.

6. The method of claim 1, wherein communicating comprises:
  determining a time period based on the operating characteristic of the second device;
  sending a message over the network to the second device; and
  responsive to the time period expiring before receiving from the second device a response to the message, resending the message to the second device.

7. The method of claim 1, wherein said communicating comprises:
  determining a time period based on the operating characteristic of the second device;
  sending a message over the network to the second device; and
  responsive to the time period expiring before receiving from the second device a response to the message, sending an error message over the network.

8. The method of claim 1, wherein said retrieving comprises the first device receiving over the network, prior to any communication over the network between the first device and the second device, the stored data representing the operating characteristics of the second device.

9. The method of claim 1, further comprising:
  retrieving by the first device, prior to said any communication over the network between the first device and the second device, the stored data further representing a third operating characteristic of the second device comprising a second length of a second type of message accepted by the second device and a fourth operating characteristic of the second device comprising a second format of the second type of message; and
  the first device communicating over the network with the second device in accordance with the second length and the second format.

10. A method in a network of an industrial automation system, the network comprising a first device, the method comprising:
  storing, in a non-transitory computer-readable medium of the network, first data of an electronic data sheet (EDS) file, the first data representing a first operating characteristic indicating a first length of a first type of message accepted by a second device and a second operating characteristic of the second device indicating a first format of the first type of message;

adding, after performing the storing, the second device to the network;

retrieving, from the computer-readable medium by the first device, the first data; and sending, by the first device, a first message of the first type over the network to the second device in accordance with the first and second operating characteristics as represented by the first data.

11. The method of claim 10, further comprising:

storing, in the computer-readable medium, second data representing a first operating characteristic of a third device;

adding, after performing the storing of the second data, the third device to the network;

retrieving, from the computer-readable medium by the first device, the second data; and sending, by the first device, a second message over the network to the third device in accordance with the first operating characteristic of the third device as represented by the second data.

12. The method of claim 10, wherein the first data further represents a third operating characteristic indicating a response time of the second device.

13. The method of claim 10, wherein the first data further represents a third operating characteristic indicating a maximum throughput of the second device.

14. The method of claim 10, wherein the first data further represents a third operating characteristic indicating a message queue length of the second device.

15. The method of claim 10, wherein the first data is data in a comments field of the EDS file.

16. The method of claim 10, wherein said retrieving comprises retrieving over the network, from the computer-readable medium by the first device, the first data.

17. The method of claim 10, wherein said first data further represents a third operating characteristic indicating a second length of a second type of message accepted by the second device and a fourth operating characteristic of the second device indicating a second format of the second type of message, the method further comprising:

sending, by the first device, a second message of the second type over the network to the second device in accordance with the third and fourth operating characteristics as represented by the first data.

* * * * *